US011884518B2

(12) United States Patent
Caldwell et al.

(10) Patent No.: US 11,884,518 B2
(45) Date of Patent: Jan. 30, 2024

(54) SYSTEMS AND METHODS FOR DISTANCE CONTROL BETWEEN PIPELAYERS

(71) Applicant: Caterpillar Inc., Peoria, IL (US)

(72) Inventors: Curtis John Caldwell, Metamora, IL (US); Aaron J. Gnagey, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 896 days.

(21) Appl. No.: 16/779,261

(22) Filed: Jan. 31, 2020

(65) Prior Publication Data

US 2021/0238016 A1 Aug. 5, 2021

(51) Int. Cl.
*B66C 13/18* (2006.01)
*G08G 9/02* (2006.01)
*B66C 23/18* (2006.01)

(52) U.S. Cl.
CPC .............. *B66C 13/18* (2013.01); *B66C 23/18* (2013.01); *G08G 9/02* (2013.01)

(58) Field of Classification Search
CPC ......... B66C 13/00; B66C 13/18; B66C 13/46; B66C 13/48; B66C 23/00; B66C 23/18; B66C 23/36; B66C 23/44; G08G 9/00; G08G 9/02; G05D 1/00; G05D 1/02; G05D 1/021; G05D 1/0268; G05D 1/0274; G05D 1/0212; G05D 1/0214; G05D 1/0276; G05D 2201/00; G05D 2201/02; G05D 2201/0202; F16L 1/00; F16L 1/024
USPC ............................................................ 701/50
See application file for complete search history.

(56) References Cited

U.S. PATENT DOCUMENTS 5,014,200 A * 5/1991 Chundrlik ............ B60K 31/047 340/904
8,127,950 B2 3/2012 Glickman et al.
2005/0187698 A1* 8/2005 Arai .................. B60W 50/0097 340/436
2019/0061756 A1* 2/2019 Adam ............... B60W 30/0953
2021/0141385 A1* 5/2021 Michaelis ....... B60W 30/18163

FOREIGN PATENT DOCUMENTS

CN 108328478 7/2018
CN 108341341 7/2018
KR 20110129099 12/2011

(Continued)

*Primary Examiner* — Khoi H Tran
*Assistant Examiner* — Sarah A Tran
(74) *Attorney, Agent, or Firm* — Lee & Hayes, P.C.

(57) ABSTRACT

A pipelayer machine includes a propulsion system, a ranging, and a controller in communication with the propulsion system and the ranging system. The controller is configured to receive a predetermined distance that the pipelayer machine is to maintain between the pipelayer machine and an adjacent pipelayer machine, determine, via the ranging system, a first distance between the pipelayer machine and the adjacent pipelayer machine, and determine that a difference between the first distance and the predetermined distance is outside of a predetermined tolerance range. The controller is further configured to modify a speed of the propulsion system based at least in part on determining that the difference is outside of the predetermined tolerance range, wherein modifying the speed of the propulsion system causes acceleration or deceleration of the pipelayer machine.

20 Claims, 5 Drawing Sheets

(56) References Cited

FOREIGN PATENT DOCUMENTS

| | | | |
|---|---|---|---|
| KR | 1115168 | | 2/2012 |
| RU | 2018901 | | 8/1994 |
| RU | 2018901 | C1 * | 8/1994 |
| RU | 153492 | | 7/2015 |

* cited by examiner

SYSTEMS AND METHODS FOR DISTANCE CONTROL BETWEEN PIPELAYERS

TECHNICAL FIELD

The present disclosure relates to a pipelayer machine. More specifically, the present disclosure relates to systems and methods for monitoring and adjusting a distance between pipelayer machines.

BACKGROUND

Pipelayer machines are often used to lay pipes in various pipelaying projects. In such pipelaying projects, sections of a pipe are bent and/or welded, or otherwise joined together, prior to laying the pipe in a trench. Once the pipe has been joined together, the pipe is lowered into the trench by pipelayer machines. Typically, more than one pipelayer machine is used to lower the pipe into the trench. The pipelayer machines work in conjunction with one another in order to safely lay the pipe in the trench. During the lowering process, the pipelayer machines must maintain proper distance from one another in order to prevent overloading one or more of the pipelayer machines. If a pipelayer machine is overloaded, the pipelayer machine may tip into the trench, be damaged, cause damage to the pipe, etc.

Pipelayer machine operators are responsible for the operation of their respective pipelayer machine. Machine operators often communicate with each other, in real time, via radio or other on-board communication devices in order to maintain proper spacing, and to coordinate lowering of the pipe. Thus, navigation of the pipelayer machine and lowering of the pipe into the trench rely on operator-to-operator communication and proper navigation by the machine operator. Any lapses in communication or incorrect navigation by an operator could result in a pipelayer machine being overloaded. Furthermore, pipelayer machines often navigate uneven and/or steep terrain. In such environments, maintaining proper distance between pipelayer machines may be even more difficult.

As mentioned previously, proper distance between pipelayer machines must be maintained to prevent overloading one or more pipelayer machines. Russian Patent Publication RU2018901C1 (hereinafter referred to as the '901 reference) describes a system for adjusting a distance between pipelayer machines. In particular, the '901 reference describes a system for determining the distance between two pipelayers interconnected by a flexible cable and a drum mounted to a sensor. The system described by the '901 reference relays data from the sensor to each of the pipelayers. The system controls the movement of the pipelayer depending on the force exerted on the cable connected between the pipelayer machines. As such, the '901 reference relies upon the force exerted on the cable to control the movement of the pipelayer machines. Thus, the systems and methods of the '901 reference rely on physical means to determine and control the distance between pipelayer machines. The system described in the '901 reference does not, however, allow an operator to seamlessly specify a distance to be automatically maintained between pipelayer machines.

Example embodiments of the present disclosure are directed toward overcoming the deficiencies described above.

SUMMARY

As will be described in greater detail below, an example pipelayer machine includes a propulsion system, one or more traction devices, a ranging system, and a controller in communication with at least one of the propulsion system, the one or more traction devices, or the ranging system. The controller is configured to receive a predetermined distance that the pipelayer machine is to maintain between the pipelayer machine and one or more adjacent pipelayer machines. The controller is further configured to determine, via the ranging system, an actual distance between the pipelayer machine at least one adjacent pipelayer machine, determine whether the actual distance and the predetermined distance are within a predetermined tolerance, and cause, via the controller, output in the propulsion system in order to accelerate or decelerate a ground speed of the pipelayer machine based at least in part on determining that the actual distance and the predetermined distance are outside of the predetermined tolerance.

An example method of automatically regulating distance between a pipelayer machine and at least one adjacent pipelayer machine includes receiving input from an operator of the pipelayer machine indicating a predetermined distance that the pipelayer machine is to maintain between the pipelayer machine and the at least one adjacent pipelayer machine. The method further includes determining, via one or more sensors of the pipelayer machine, a first distance between the pipelayer machine and the at least one adjacent pipelayer machine, determining whether the distance is within a predetermined tolerance of the predetermined distance, and causing, via a controller of the pipelayer machine, the pipelayer machine to adjust output in a propulsion system in order to adjust a position of the pipelayer machine relative to the at least one adjacent pipelayer machine such that a second distance between the pipelayer machine and the at least one adjacent pipelayer machine is within the predetermined tolerance of the predetermined distance.

In a further example, a pipelayer machine includes a propulsion system, a user interface, one or more sensors, and a controller in communication with at least one of the propulsion system, the user interface, or the one or more sensors. The controller is configured to receive, via the user interface, a predetermined distance that the pipelayer machine is to maintain between the pipelayer machine and an adjacent pipelayer machine. The controller is further configured to determine, via the one or more sensors, an actual distance between the pipelayer machine and the adjacent pipelayer machine, determine whether the actual distance is substantially equal to the predetermined distance, and cause, via the controller, output in the propulsion system in order to adjust a position of the pipelayer machine relative to the adjacent pipelayer machine.

DETAILED DESCRIPTION

Figure 1:
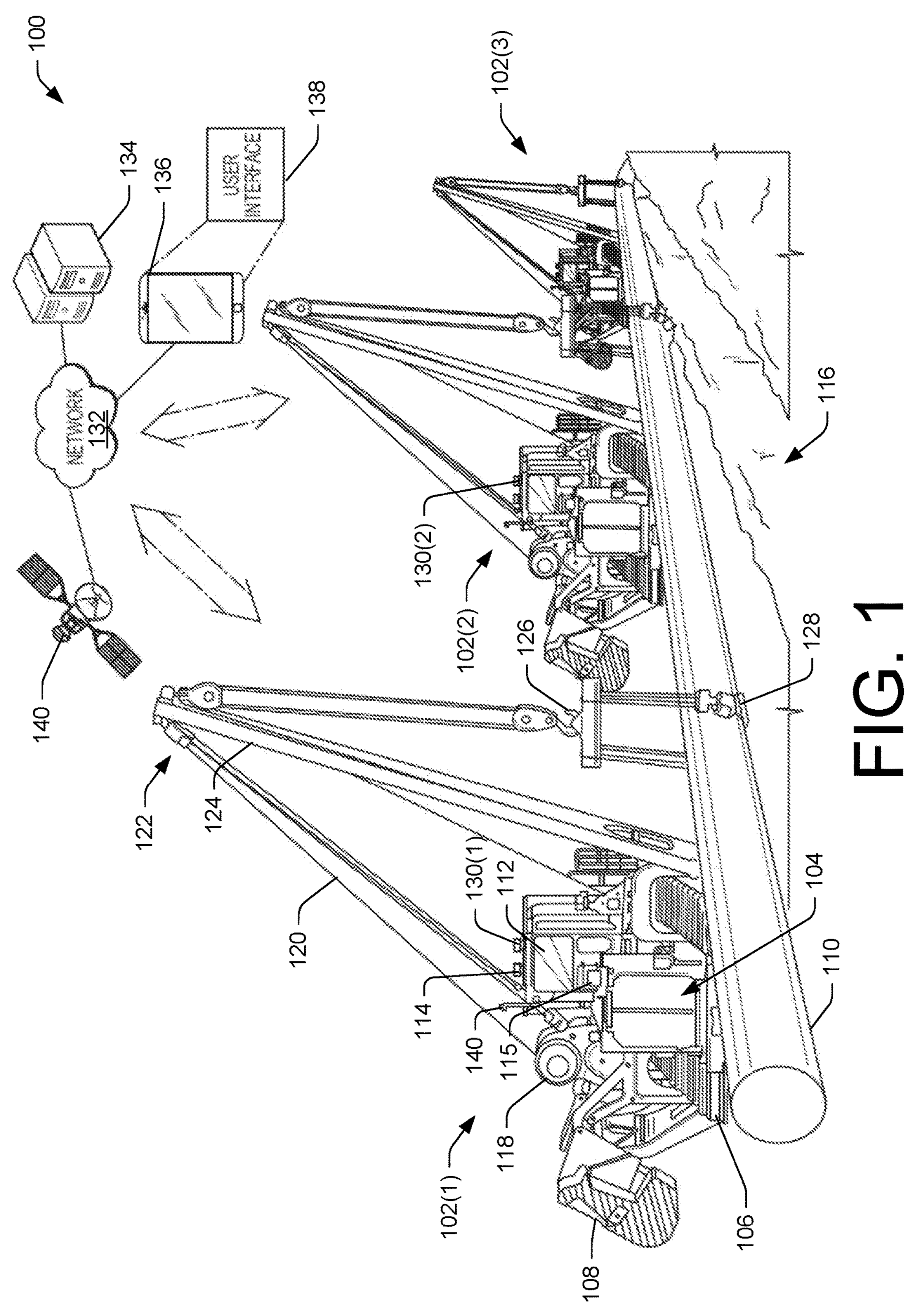
FIG. 1 is a schematic illustration of a pipelaying system in accordance with an example of the present disclosure.

Wherever possible, the same reference numbers will be used throughout the drawings to refer to the same or like parts. Referring to FIG. 1, an example pipelaying system 100 includes one or more pipelaying machines 102. In some examples, the pipelaying machines 102 may include machines specifically designed to place, position, deposit, stage, or otherwise dispose lengths of pipe into a ditch, trench, or other location during a pipelaying project. Additionally, and/or alternatively, the pipelaying machines 102 may include alternative types of machinery configured to lay pipe in a pipelaying project. For example, the pipelaying machines 102 may include excavator(s), loader(s), backhoe(s), etc.

In some examples, the pipelaying machines 102 include a propulsion system 104 or other power source housed in an engine compartment or other housing. In some examples, the propulsion system 104 may include an engine, transmission, a hydrostatic drive system, an electric motor, etc. While the following description is described in reference to the first pipelayer machine 102(1), any and/or each of the pipelayer machines 102(1), 102(2), and 102(3) (collectively "pipelayer machines 102") may include the same components described herein. The pipelaying machines 102 further include one or more traction devices 106. Such traction devices 106 may include tracks, wheels, and/or other types of devices to assist the pipelayer machine 102 to navigate over terrain. The propulsion system 104 is operable to drive the traction devices 106 in order to propel the pipelayer machine 102. In some examples, the traction devices 106 may include sensor(s) to determine movement of the traction devices 106 and/or determine when the traction devices 106 lack traction and are unable to propel the pipelayer machine (e.g., if the traction devices 106 are stuck in mud, a hole, etc.). The pipelayer machines 102 further include counterweights 108. The counterweights 108 may be designed to counterbalance a weight of a pipe 110 held by the individual pipelayer machines 102. The counterweights 108 may be movable relative to the pipelayer machine 102 in order to counterbalance the specific weight held by the pipelayer machine 102. The pipelayer machines 102 further include a cab 112 in which an operator resides while operating the pipelayer machine 102. Additionally, and/or alternatively, the cab 112 may be omitted, and a remote-control operator may control the pipelayer machines 102. Furthermore, the pipelayer machines 102 may operate autonomously and may not require an operator and/or cab 112. In the cab 112 may be located a user interface, one or more operator controls (e.g., joystick, acceleration pedal(s), deceleration pedal(s), etc.), and/or other controls or interfaces to assist the operator in the operation of the pipelayer machine 102. In some examples, such a user interface, operator controls, and/or other controls or interfaces may be located remote from the pipelayer machine 102. For example, the interfaces and/or controls may be located on a remote-control console and/or on a remote computer system.

The pipelayer machines 102 may further include a ranging system 114 having one or more sensors 115 configured to determine a distance between the pipelayer machine 102 and other pipelayer machines, other machinery (e.g., vehicles onsite, excavators, etc.), a trench 116, and/or other surrounding environment. The ranging system 114 may be located on any portion of the pipelayer machines 102 and/or in multiple locations on the pipelayer machines 102. The one or more sensors 115 of the ranging system 114 may include one or more non-contact sensors such as location sensors or other types of non-contact sensors. For example, the sensors 115 of the ranging system 114 may include proximity sensors, radio detection and ranging (RADAR) sensors, light imaging, detection, and ranging (LIDAR) sensors, sound navigation ranging (SONAR) sensors, cameras, global position systems (GPS), machine to machine communication device(s), universal total station(s) (UTS), geographic information system(s) (GIS), global navigation satellite system (GNSS), etc. In some examples, the sensors 115 of the ranging system 114 may include a GPS receiver, transmitter, transceiver, laser prisms, and/or other such devices, and the sensors 115 may be in communication with one or more GPS satellites 140 and/or UTS to determine a respective location of the machine to which the location sensor is connected continuously, substantially continuously, or at various time intervals.

The pipelayer machines 102 may also include a winch 118 that controls movement of a cable 120 through a pully system 122. The pully system 122 may be attached at least partially to a boom 124 of the pipelayer machine 102. The boom 124 of the pipelayer machines 102 is movable in order to provide accurate placement of the pipe 110 during the pipelaying process. The pipelayer machine 102 may also include a hook 126 with a roller cradle 128, harness, or other attachment device attached thereto. In some examples, the hook 126 may include one or more sensors that determine a weight of a load held by the hook 126. The roller cradle 128 may allow the pipelayer machine 102 to adjust a position at which the pipelayer machine 102 lifts the pipe 110 without having to detach and reattach the harness. In some examples, the roller cradle 128 may slide along a length of the pipe 100 as the pipelayer machine 102 moves relative to the pipe 110.

The pipelayer machines 102 may also include a controller 130 communicatively coupled to one or more components of the pipelayer machine 102 as described above. As used herein, the term "controller" is meant in its broadest sense to include one or more controllers, processors, central processing units, and/or microprocessors that may be associated with the pipelayer machines 102 and/or the pipelaying system 100, and that may cooperate in controlling various functions and operations of the pipelaying machines 102 and/or the pipelaying system 100. For example, the controller 130 may be communicatively coupled to the propulsion system 104, the traction devices 106, the counterweight 108, the ranging system 114, the winch 118, the boom 124, the one or more sensors of the hook 126, etc. Furthermore, the controller 130 may be communicatively coupled to sensor(s) that are configured to monitor performance of the one or more components. The controller 130 may receive performance data from such sensors. The controller 130 may be configured to control the function of the one or more components of the pipelayer machine 102. For example, the controller 130 may control output of the propulsion system 104, a position of the boom 124, movement of the traction devices 106, winding or unwinding of the winch 118, etc. As will be described further herein, the controller 130 may determine, from the one or more components of the pipelayer machine, varying metrics related to the pipelayer machine 102, and may control operations of the pipelayer machine 102 based at least in part on such metrics. For example, the controller 130 may determine, via the ranging system, a distance between a first pipelayer machine 102(1) and a second pipelayer machine 102(2). Thus, the controller 130 may determine and/or monitor the distance between pipelayer machines 102 and their respective adjacent pipelayer machines 102. Furthermore, the controller 130 may determine, via one or more sensors, a load held by the pipelayer machines 102. The controller 130 may adjust a position of one or more of the pipelayer machines 102 to redistribute the weight of the pipe 110 between the adjacent pipelayer machines 102. Adjusting the relative positions of adjacent pipelayer machines in this way may prevent overloading of the respective pipelayer machines 102. In some examples, the controller 130 may further be communicatively coupled to a display device such as electronic device 136 that may be disposed within the cab 112, and the display device may be configured to display a user interface 138 to the operator. In some examples, the electronic device 136 having the user interface may be remote from the pipelayer machine 102(1). For example, the electronic device 136 may be included in a remote-control system and/or other remote location. The user interface 138 will be described further herein below with respect to FIG. 5.

Furthermore, the controller 130 of each of the respective pipelayer machines 102 may be in communication with one another. For example, a first controller 130(1) of the first pipelayer machine 102(1) may be in communication with a second controller 130(2) of the second pipelayer machine 102(2) via one or more wireless networks operable at the worksite. In such examples, the machines may further include one or more transmitters, receivers, transceivers, or other communications devices operably coupled to the respective controllers 130 and configured to facilitate the transmission of signals, data, or other methods of device-to-device communication. For example, the controller 130 and/or other components of the pipelayer machines 102 may be in communication and/or otherwise operably connected to any other components of the pipelaying system 100 via a network 132. The network 132 may be a local area network ("LAN"), a larger network such as a wide area network ("WAN"), or a collection of networks, such as the Internet. Protocols for network communication, such as TCP/IP, may be used to implement the network 132. Although embodiments are described herein as using a network 132 such as the Internet, other distribution techniques may be implemented that transmit information via memory cards, flash memory, or other portable memory devices.

The controller 130 may be in communication, via the network 132, with a system controller 134. The system controller 134 may be an electronic controller that operates in logical fashion to perform operations, execute algorithms, store and retrieve data and/or other desired operations. The system controller 134 may include or access memory, secondary storage devices, processors, and any other components for running an application. The memory and secondary storage devices may be in the form of read-only memory (ROM) or random-access memory (RAM) or integrated circuitry that is accessible by the controller. Various other circuits may be associated with the system controller 134 such as power supply circuitry, signal conditioning circuitry, driver circuitry, and/or other types of circuitry. The system controller 134 may be a single controller or may include more than one controller (such as additional controllers associated with components of the pipelaying system 100) configured to control various functions and/or features of the pipelaying system 100. As used herein, the term "controller" is meant in its broadest sense to include one or more controllers, processors, central processing units, and/or microprocessors that may be associated with the pipelaying system 100, and that may cooperate in controlling various functions and operations of the pipelaying system 100. The functionality of the system controller 134 may be implemented in hardware and/or software without regard to the functionality. The system controller 134 may rely on one or more data maps, look-up tables, neural networks, algorithms, machine learning algorithms, data layers, predictive layers, and/or other components relating to the operating conditions and the operating environment of the pipelaying system 100 that may be stored in the memory of the system controller 134. Each of the data maps noted above may include a collection of data in the form of tables, graphs, and/or equations to maximize the performance and efficiency of the pipelaying system 100 and its operation.

In any of the examples described herein, the system controller 134 and/or the controllers 130 may enable communication with one or more tablets, computers, cellular/wireless telephones, personal digital assistants, mobile devices, or other electronic devices 136 located at a worksite, on the pipelayer machines 102, and/or remote from the worksite. Such electronic devices 136 may include, for example, mobile phones and/or tablets of project managers (e.g., foremen) overseeing daily paving operations at the worksite. Furthermore, the electronic devices 136 may include devices of the operators of the pipelayer machines 102. The electronic devices 136 may include a user interface 138 described above and described further herein below with respect to FIG. 5. As mentioned above, the electronic devices 136 having the user interface 138 may be included in the cab 112 of the pipelayer machines 102. In some examples, the electronic devices 136 may be configured to communicate with one another and to provide communication between the controllers 130.

Figure 2:
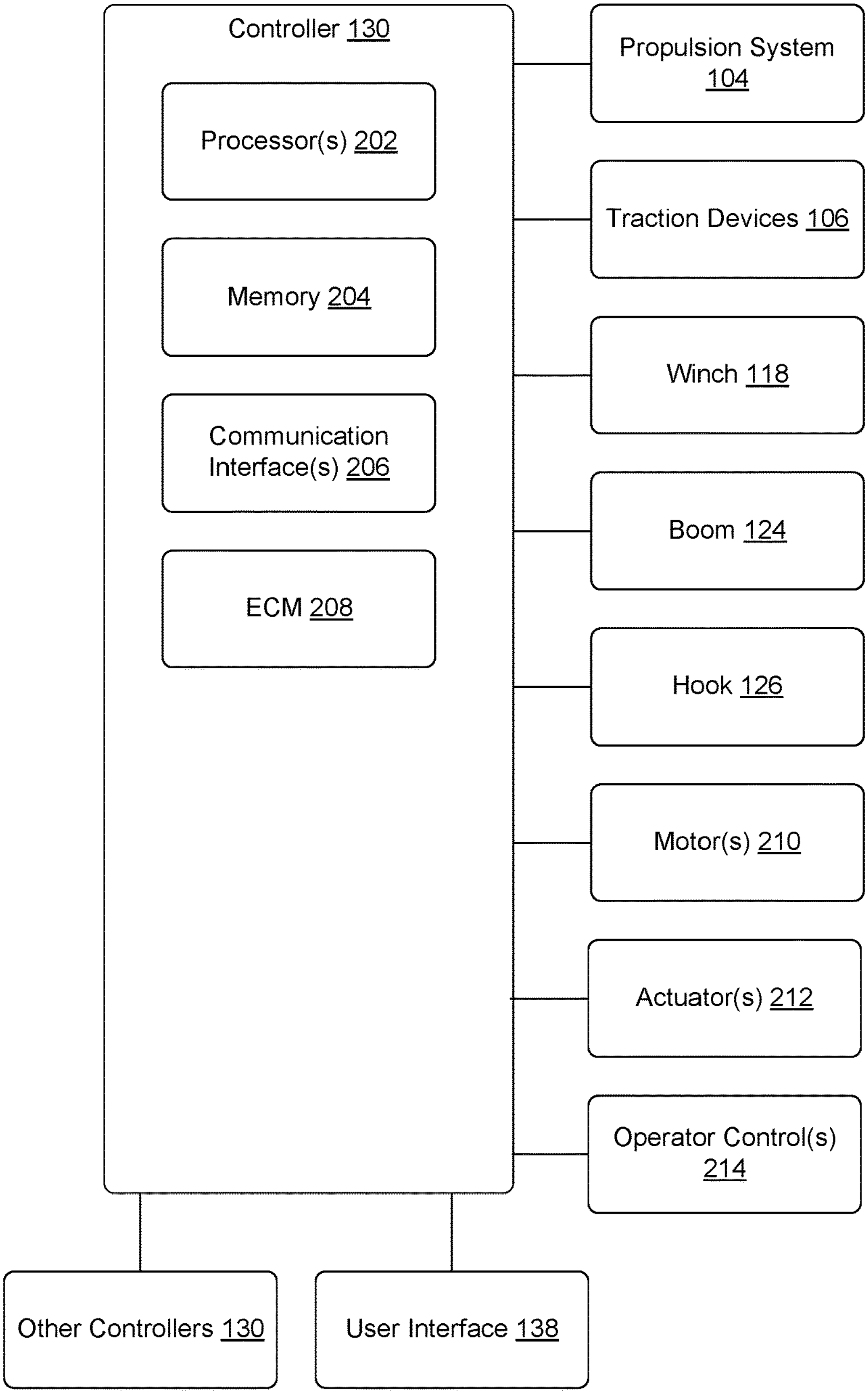
FIG. 2 is a schematic illustration of a controller of a pipelayer machine in accordance with an example of the present disclosure.

FIG. 2 depicts a schematic illustration of the controller 130 as described above with respect to FIG. 1. While described as a single controller, the controller 130 may include multiple controllers. Furthermore, the controller 130 may include one or more computing devices or other controllers that are on-board or incorporated into the pipelayer machines 102. Additionally, and/or alternatively, the controller 130 may include controllers that are off-board and/or partially off-board and/or remote from the pipelayer machines 102. The controller 130 includes one or more processors 202, system memory 204, and communication interfaces 206. The controller may further include an engine control module (ECM) 208. The ECM 208 may include a separate hardware element linked to the other elements of the controller 130, such as a dedicated controller with its own processors 202, memory 204, and/or communication interfaces 206. In some examples, the controller 130 and/or the ECM 208 include memory 204 that may store computer-executable instructions and other data associated with operations described herein, and one or more processors 202 that execute the computer-executable instructions associated with the ECM 208 and/or the controller 130. Additionally, and/or alternatively, the ECM 208 may include a software module such that computer-executable instructions and other data associated with the ECM 208 may be stored and/or executed by one or more other controllers.

The processor(s) 202 may operate to perform a variety of functions, as set forth herein. In some examples, the processor(s) 202 may include a central processing unit (CPU), a graphics processing unit (GPU), both CPU and GPU, or other processing units or components known in the art. System memory 204 can be volatile and/or non-volatile computer-readable media including integrated or removable memory devices including random-access memory (RAM), read-only memory (ROM), flash memory, a hard drive or other disk drives, a memory card, optical storage, magnetic storage, and/or any other computer-readable media. The computer-readable media may be non-transitory computer-readable media. The computer-readable media may be configured to store computer-executable instructions that can be executed by the processor(s) 202 to perform the operations described herein. Additionally, the processor(s) 202 may possess local memory, which also may store program modules, program data, and/or one or more operating systems.

Examples may be provided as a computer program item including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, example embodiments may also be provided as a computer program item including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some examples, the controller 130 may be operably connected to the propulsion system 104 of the pipelayer machine 102. In such an example, the propulsion system 104 may include one or more sensors that are in communication with the controller 130. Furthermore, the controller 130 may control output of the propulsion system 104. For example, the controller 130 may increase or decrease the output of the propulsion system 104 based on data received from the pipelayer machine 102 and/or other pipelayer machines. Controlling the output of the propulsion system 104 may include increasing/decreasing engine speed, increasing/decreasing transmission speed, changing transmission gear, etc. For example, the controller 130 may determine that the first pipelayer machine 102(1) is too far from an adjacent pipelayer machine 102(2). In response, the controller 130 may increase output of the propulsion system 104, thereby causing a commensurate increase in the ground speed of the first pipelayer machine 102(1), and a reduction in the distance between the first pipelayer machine 102(1) and the adjacent pipelayer machine 102(2). Furthermore, the controller 130 may be communicatively coupled to the traction devices 106. In such an example, the traction devices 106 may include one or more sensors that are in communication with the controller 130. For example, the one or more sensors of the traction devices 106 may sense whether the traction devices 106 are slipping or have adequate traction. In some examples, the controller 130 may increase or decrease output of the propulsion system 104 based on a rate of rotation of the traction devices 106. Thus, the controller 130 may adjust ground speed of the pipelayer machine 102(1). For example, the controller 130 may adjust speed of the propulsion system 104 that is coupled to a transmission that controls rotation of the traction devices 106, thereby adjusting the ground speed of the pipelayer machine 102(1). The transmission may include any type of transmission including, but not limited to, a continuously variable transmission (CVT), an automated manual transmission (AMT), an automatic transmission, a manual transmission, etc. The controller 130 may control movement of the pipelayer machine 102(1) at least in part on the ground speed of the pipelayer machine 102(1) and/or adjacent pipelayer machines 102.

The controller 130 may further be operably coupled to the boom 124, the hook 126, and/or the winch 118. For example, the controller 130 may be operably coupled to one or more motors 210 and/or one or more actuators 212 that are configured to control movement of the boom 124, the hook 126, the winch 118, and/or other components of the pipelayer machine 102. In some examples, the boom 124, the hook 126, and/or the winch 118 may each include one or more sensors. For example, the hook 126 may include one or more sensors that monitor or otherwise determine a weight of the load held by the hook 126 and may send such data to the controller 130. Furthermore, the boom 124 may include one or more sensors that monitor or otherwise determine a position of the boom 124 and/or a force exerted on the boom 124 and may send such data to the controller 130. Still further, the winch 118 may include one or more sensors that monitor or otherwise determine an amount of cable 120 that is held by the winch 118, a force exerted on the cable 120 by a load such as the pipe 110, a rate at which the cable 120 is wound up or let out, etc. The controller 130 may further be operably connected to other components of the pipelayer machine 102. In such examples, the controller 130 may be configured to control the operations of such components.

The controller 130 may also be operably coupled to one or more operator controls 214. In such an embodiment, the controller 130 may receive data indicative of operator input received via the one or more operator controls 214 to control the output and/or operation of the pipelayer machines 102. In some examples, input received via the one or more operator controls 214 may override the controller 130. For example, as described above and further herein below, the controller 130 may be configured to maintain a predetermined distance between a first pipelayer machine 102(1) and an adjacent pipelayer machine 102(2). However, if the operator of the first pipelayer machine 102(1) manually controls the operation and/or movement of the pipelayer machine 102(1), via the one or more operator controls 214, such manual operation of the pipelayer machine 102(1) may override the controller 130 automatically maintaining the predetermined distance. For example, the controller 130 may automatically regulate or otherwise maintain a predetermined distance between the first pipelayer machine 102(1) and at least one adjacent pipelayer machine 102(2). However, if an operator controls the pipelayer machine 102(1) via the operator controls 214, the operator may seamlessly override the controller 130 and the predetermined distance. In such an example, if the controller 130 receives an input via the operator controls 214 that is indicative of a value (e.g., speed or other movement) that exceeds a predetermined threshold associated with automatic/autonomous control, logic associated with the controller 130 may cause the pipelayer machine 102(1) to operate in accordance with the input, at least temporarily overriding the previous setting (e.g., specified distance). In such an example, the operator may override the predetermined distance automatically maintained by the controller 130 via the operator controls 214 and may operate the pipelayer machine 102(1) such that a distance between the pipelayer machine 102(1) and at least one adjacent pipelayer machine 102(2) is greater than or less than the predetermined distance. However, if the operator continues to move the pipelayer machine 102(1) in a direction that continues to be greater than or less than the predetermined distance, the controller 130 may regain control of the pipelayer machine 102(1) if a predetermined tolerance is reached. For example, the controller 130(1) of the first pipelayer machine 102(1) may receive an input indicating that the controller 130(1) is to maintain a distance of 60 feet between the first pipelayer machine 102(1) and the second pipelayer machine 102(2). As the pipelayer machines 102(1) and 102(2) accelerate, decelerate, move at a constant rate, or otherwise navigate, the controller 130(1) may maintain a distance of 60 feet between the pipelayer machines 102 in accordance with such an input. However, if the controller 130(1) receives input from an operator via the operator controls 214 that would cause operation of the pipelayer machine 102(1) outside of the above parameter, the operator may override the controller 130(1). Following the example above, the operator of the first pipelayer machine 102(1) may increase the ground speed of the first pipelayer machine 102(1) in order to increase the distance between the first pipelayer machine 102(1) and the second pipelayer machine 102(2), or vis versa. The operator may be able to override the controller 130 until a predetermined tolerance (or override tolerance range) is reached. For example, the predetermined tolerance may be approximately 15 feet. Therefore, if the operator controls movement of the first pipelayer machine 102(1) such that the distance between the first pipelayer machine 102(1) and the second pipelayer machine 102(2) reaches and/or exceeds 75 feet, the controller 130 may then override the operator's control of the first pipelayer machine 102(1) and may regulate the distance between the pipelayer machines 102 within the predetermined tolerance of the predetermined distance. Additionally, and/or alternatively, if the operator controls movement of the first pipelayer machine 102(1) such that the distance between the first pipelayer machine 102(1) and the second pipelayer machine 102(2) reaches and/or is less than 45 feet, the controller 130 may then override the operator's control of the first pipelayer machine 102(1) and may regulate the distance between the pipelayer machines 102 within the predetermined tolerance of the predetermined distance. It is to be noted that the above values are merely examples and that in operating conditions values greater than or less than those noted above may be used for the predetermined distance and/or the predetermined tolerance.

The controller 130 may further be communicatively coupled to one or more other controllers 130 of other pipelayer machines 102. Thus, a controller 130 may be able to monitor and control the operation of a pipelayer machine 102(1) in which the controller 130 is included, and the controller 130 may also be able to monitor the performance and operation of other pipelayer machines 102(2), 102(3) and may be able to control operation of the respective pipelayer machine 102(1) in which the controller 130 is included based on the operation of the other pipelayer machines 102(2), 102(3). For example, if the controller 130(1) of the first pipelayer machine 102(1) receives an indication from the second controller 130(2) of the second pipelayer machine 102(2) that the second pipelayer machine 102(2) is unable to maintain a predetermined distance between the two pipelayer machines 102(1), 102(2), the first controller 130(1) may control movement of the first pipelayer machine 102(1) in order to ensure that the distance between the two pipelayer machines 102(1), 102(2) does not exceed a predetermined tolerance. This and other operations of the controller 130 and the pipelayer machines will be described further herein below with respect to FIG. 3.

Furthermore, the controller 130 may be communicatively coupled to the user interface 138. In some examples, the controller 130 may generate data that is displayed to an operator via the user interface 138. Additionally, and/or alternatively, the controller 130 may receive one or more inputs from an operator via the user interface 138. Such inputs may include control over the various components of the pipelayer machine 102(1) and/or may include various metrics for the controller 130 to monitor. For example, an operator may specify, via the user interface 138, a distance that the pipelayer machine 102(1) is to maintain with another pipelayer machine 102(2). In such an example, the controller 130 may automatically control navigation of the pipelayer machine 102(1) in order to maintain the specified distance with the other pipelayer machine 102(2). Such processes will be described further herein below.

Figure 3:
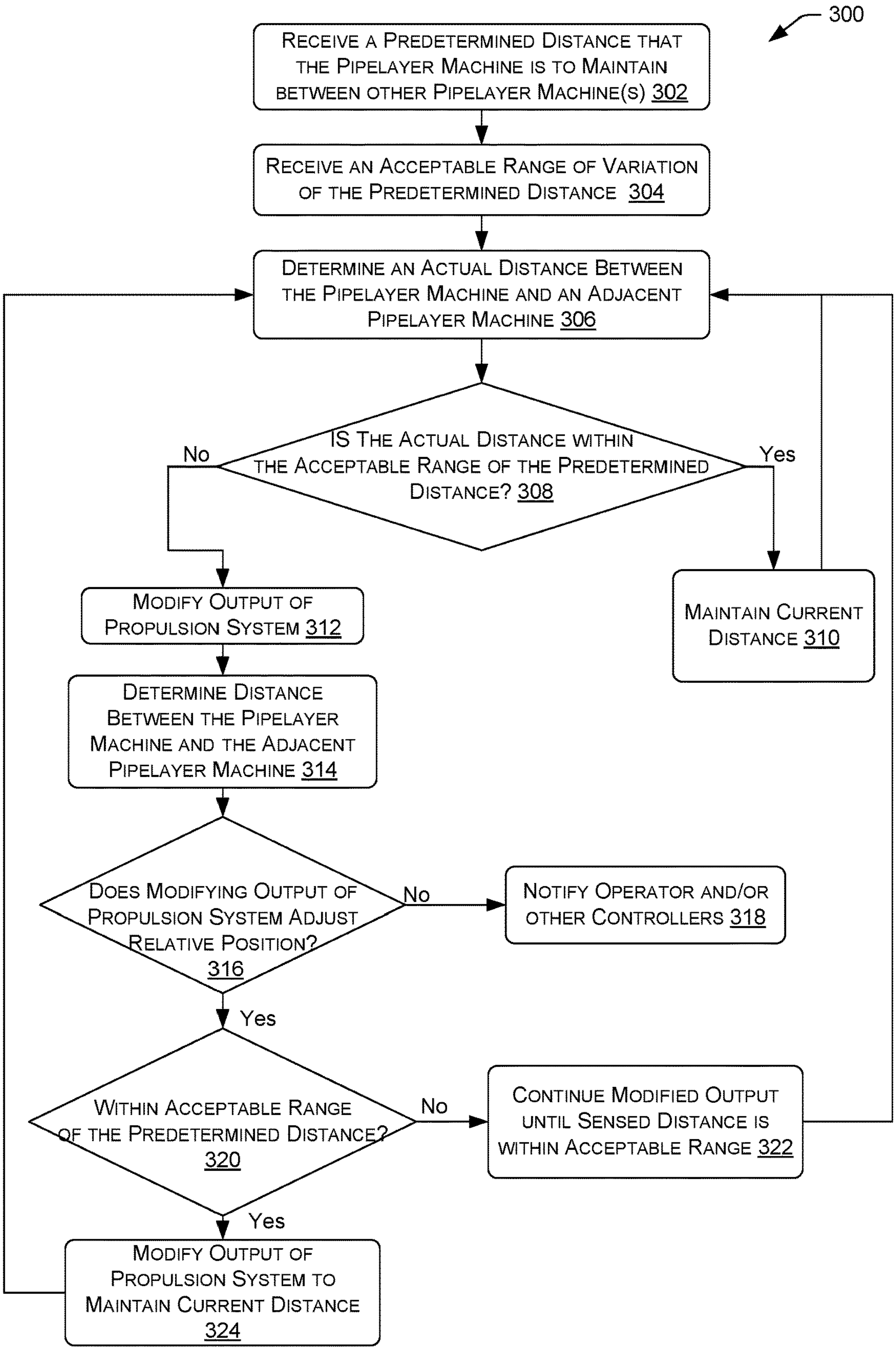
FIG. 3 is a flowchart illustrating an exemplary disclosed process for controlling a distance between pipelayer machines in accordance with an example of the present disclosure.

FIG. 3 shows an exemplary method 300 for maintaining a predetermined distance between pipelayer machines 102, consistent with examples of the disclosure. The example method 300 is illustrated as a collection of steps in a logical flow diagram, which represents operations that may be implemented in hardware, software, or a combination thereof. In the context of software, the steps represent computer-executable instructions stored in memory. Such computer-executable instructions may include routines, programs, objects, components, data structures, and the like that perform particular functions or implement particular abstract data types. The order in which the operations are described is not intended to be construed as a limitation, and any number of the described steps may be combined in any order and/or in parallel to implement the process. For discussion purposes, and unless otherwise specified, the method 300 is described with reference to the pipelayer machines 102, the controller 130, and/or other components shown in FIGS. 1 and 2. In particular, and unless otherwise specified, the method 300 will be described with respect to the controller 130 for ease of description.

With reference to FIG. 3, at 302, the controller 130 may receive an input indicating a predetermined distance that a pipelayer machine 102(1) is to maintain between the pipelayer machine 102(1) and at least one adjacent pipelayer machine 102(2). In some examples, the controller 130 may receive the predetermined distance as input received via the user interface 138. An operator of the pipelayer machine 102(1) may input the predetermined distance via the user interface 138 that may be provided in the cab 112. Additionally, and/or alternatively, a foreman and/or other jobsite supervisor may specify the predetermined distance and may input such distance data via a user interface 138 on one or more electronic devices 136. In some examples, the controller 130 may determine the predetermined distance based on a weight and/or other dimensions of the pipe 110 that is to be laid in the trench 116. Additionally, and/or alternatively, the controller 130 may determine such a distance based on specifications and/or capacities of the pipelayer machines 102 used in the pipelaying process. In some examples, the controller 130 may implement a lookup table to determine the predetermined distance to maintain between pipelayer machines 102 based on various factors of the pipelaying system 100. In some examples, the pipelayer machine 102 may maintain the predetermined distance with at least one adjacent pipelayer machine. Additionally, and/or alternatively, the pipelayer machine 102 may maintain the predetermined distance with multiple adjacent pipelayer machines 102. For example, a plurality of pipelayer machines 102 may be used to position and/or otherwise deposit a pipe 110 in a trench 116. The plurality of pipelayer machines 102 may travel in a common direction as they progressively lay the pipe 110 in the trench 116. In such an example, the pipelayer machine 102 may be a second pipelayer machine 102(2) disposed between a first pipelayer machine 102(1) and a third pipelayer machine 102(3). The predetermined distance may represent a distance that the second pipelayer machine 102(2) is to maintain between the first pipelayer machine 102(1) and/or the third pipelayer machine 102(3).

At 304, the controller 130 may receive from the operator of the pipelayer machine 102(1) an acceptable range of variation of the predetermined distance that the controller 130 is to maintain between pipelayer machines 102. For ease of reference, the acceptable range of variation may be referred to herein as a "predetermined tolerance." For example, the operator may indicate a predetermined tolerance that represents a distance that is greater than and/or less (e.g., +/−10 ft) than the predetermined distance (e.g., 60 ft) that the pipelayer machine 102(1) may maintain with at least one adjacent pipelayer machine (e.g., 102(2)). The predetermined tolerance may be based at least in part on a value of the predetermined distance and/or other factors of the pipelaying system 100 and the environment. In some examples, the controller 130 may determine the predetermined tolerance based on such factors using a lookup table. Furthermore, the predetermined tolerance may be directly related to the predetermined distance. In such an example, the predetermined tolerance may be a specified percentage (e.g., such as a safety factor percentage) of the predetermined distance. Thus, the controller 130 may automatically regulate the distance between pipelayer machines 102 within an acceptable range of variation.

At 306, the controller 130 may determine an actual distance between the pipelayer machine 102(1) and at least one adjacent pipelayer machine 102(2). In such an example, the controller 130 may receive, from the ranging system 114, distance data representing at least a distance between the pipelayer machine 102(1) and the at least one adjacent pipelayer machine 102(2). For example, the controller 130 may receive GPS data indicating positions of the pipelayer machines 102 and may determine the distance based on the GPS data. Additionally, and/or alternatively, the controller 130 may receive actual distance data determined by the sensors 115 (e.g., proximity sensors, LIDAR, RADAR, etc.) of the pipelayer machine 102(1) and/or the adjacent machine 102(2). In some examples, the controller 130 may determine an actual distance between the pipelayer machine 102(1) and multiple pipelayer machines 102(2) and 102(3) (or other pipelayer machines not shown in FIG. 1). For example, when traveling in a same direction as other pipelayer machines, the controller 130 may determine a distance between the pipelayer machine 102(1) and a pipelayer machine in front of and/or behind the pipelayer machine 102(1). Thus, the controller 130 may determine and/or monitor the distance between the pipelayer machine 102(1) and other pipelayer machines. Furthermore, the controller 130 may determine, via the ranging system 114, a distance between the pipelayer machine 102 and one or more objects or features surrounding the pipelayer machine 102, at 304. For example, the controller 130 may receive sensor data from the sensors 115 and may determine a distance and/or distances between the pipelayer machine 102 and a trench, another machine, personnel, vegetation, etc. based at least in part on the sensor data. The sensor data may be generated via LIDAR, RADAR, SONAR, proximity sensors, and/or any other sensor types. Such determinations may be used to control movement of the pipelayer machine 102(1) and/or individual components of the pipelayer machine 102(1).

At 308, the controller 130 may determine whether the actual distance between the pipelayer machine 102(1) and the at least one adjacent pipelayer machine 102(2) is within a predetermined tolerance of the predetermined distance. For example, at 302 the controller 130 may receive an indication that the controller is to maintain a predetermined distance of 35 feet between the pipelayer machine 102(1) and at least one adjacent pipelayer machine 102(2). The controller 130 may also receive, at 304, an acceptable range of variation from the predetermined distance (e.g., 10 ft) that the controller 130 may allow between the pipelayer machines 102, as specified in the predetermined tolerance. Thus, the controller 130 may determine whether the actual distance between the pipelayer machine 102 and the at least one adjacent pipelayer machine is within the predetermined tolerance (or the acceptable range) (e.g., 10 ft.) of the predetermined distance (35 ft.).

If at 308, the controller 130 determines that the actual distance is within the acceptable range of variation from the predetermined distance, at 310, the controller 130 may cause the pipelayer machine 102(1) to continue maintaining a current distance between the pipelayer machine 102(1) and at least one adjacent pipelayer machine 102(2). As shown in FIG. 3, the controller 130 may continue monitoring the distance between the pipelayer machine 102(1) and the at least one adjacent pipelayer machine 102(2), at 306.

If at 308, the controller 130 determines that the actual distance is outside of the acceptable range of variation from the predetermined distance, at 312, the controller 130 may cause the pipelayer machine 102 to adjust position relative to at least one adjacent pipelayer machine 102(2). For example, the controller 130 may modify output of the propulsion system 104 based at least in part on determining that the difference between the actual distance and the predetermined distance is outside of the acceptable range of variation. Modifying the output of the propulsion system 104 may include increasing or decreasing engine speed, transmission speed, changing transmission gear, and/or any other appropriate action. In some examples, modifying output of the propulsion system 104 may result in increasing or decreasing a ground speed of the pipelayer machine 102(1). Furthermore, even though the controller 130 may modify the output of the propulsion system 104, the pipelayer machine 102(1) may encounter hinderance(s) that may inhibit adjustment of the ground speed of the pipelayer machine 102(1). Following the example described above, if at 308 the controller 130 determines that the pipelayer machine 102(1) is 50 feet away from an adjacent pipelayer machine 102(2), the controller 130 may increase engine speed, increase transmission speed, change transmission gear, etc., thereby moving the traction devices 106. Thus, the controller 130 may adjust the ground speed of the pipelayer machine 102(1) in order to move the pipelayer machine 102(1) closer to the adjacent pipelayer machine 102(2). In some examples, the controller 130 may determine a difference between the actual distance and the predetermined distance. The controller 130 may modify output of the propulsion system 104 of the pipelayer machine 102(1) based on the difference. For example, if the controller 130 determines that the difference is relatively large, the controller 130 may correct the position of the pipelayer machine 102 more aggressively (e.g., higher acceleration or deceleration) than if the difference is relatively small. In such examples, the controller 130 may access a lookup table that specifies varying differences (or ranges of differences)

between the actual distance and the predetermined distance and corresponding accelerations rates based on the determined difference. Furthermore, an operator or other user may specify acceleration and deceleration limits for the pipelayer machines 102.

At 314, the controller 130 may determine the distance between the pipelayer machine 102(1) and the adjacent pipelayer machine 102(2). As described above with respect to 308, the controller 130 may receive distance data and/or location data from the ranging system 114 and may determine the distance from such data.

At 316, the controller 130 may determine, from the distance, whether modifying the speed of the engine adjusted a position of the pipelayer machine 102(1) relative to the adjacent pipelayer machine 102(2). If, at 316, the controller 130 determines that the pipelayer machine 102(1) is unable to adjust position, the controller 130 may notify the operator, at 318. For example, if the pipelayer machine 102(1) is unable to adjust positions (e.g., stuck in mud, hole, obstruction in the way, etc.), the controller 130 may alert the operator via a notification sent to the electronic device 136 in the cab 112 of the pipelayer machine 102(1). Such a notification may include an audio and/or visual notification (or other warning) that may be provided via the user interface 138 and/or speakers in the cab 112. Furthermore, if the controller 130 determines that the pipelayer machine 102(1) is unable to maintain the predetermined distance, the controller 130 may send a signal indicating such to one or more other controllers of other pipelayer machines (e.g., 102(2) and 102(3)). Such a signal may cause the other pipelayer machines to stop, accelerate, decelerate, and/or otherwise adjust their position and/or speed in order to maintain the actual distance within the predetermined tolerance of the predetermined distance. Thus, in some examples, the controller 130 may coordinate with other controllers to coordinate movement of a plurality of pipelayer machines in a semi-autonomous and/or autonomous manner. For example, the controller 130 of the pipelayer machine 102(1) may send navigation data to the other controllers indicating that the pipelayer machine 102(1) began to move, an acceleration rate of the pipelayer machine 102(1), a velocity of the pipelayer machine 102(1), a deceleration rate, an indication that the pipelayer machine 102(1) has stopped, etc. The controller 130 may further receive navigation data from other controllers of other pipelayer machines. Thereby, the controllers of various pipelayer machines may cause output of their respective pipelayer machines that is substantially similar to other pipelayer machines. By sharing navigation data sent between controllers, the controllers of a plurality of pipelayer machines 102 may coordinate movement of the pipelayer machines during a pipelaying process.

If, at 316, the controller 130 determines, from the distance, that modifying the output of the propulsion system 104 adjusted the position (and/or ground speed) of the pipelayer machine 102(1) relative to the adjacent pipelayer machine 102(2), the controller 130 may follow the "Yes" path and determine whether the distance is within the acceptable range of the predetermined distance, at 320.

If, at 320, the controller 130 determines that the distance is still outside the acceptable range of the predetermined distance, the controller 130 may continue to operate the propulsion system 104 of the pipelayer machine 102(1) at the modified output until the sensed distance is within the acceptable range of the predetermined distance.

If, at 324, the controller 130 determines that the distance is within the acceptable range of the predetermined distance, the controller 130 may again modify the speed of the engine in order to maintain the current distance between the pipelayer machines 102. For example, if the controller 130 increases output of the propulsion system 104 at 312, the controller 130 may then reduce output of the propulsion system 104 at 324 to an output that the propulsion system 102 was operating at prior to modifying the speed of the engine at 312. Once the controller 130 has again modified the output of the propulsion system 104 to maintain the current distance between pipelayer machines 102, the controller 130 may resume monitoring the distance between pipelayer machines at 306.

Figure 4:
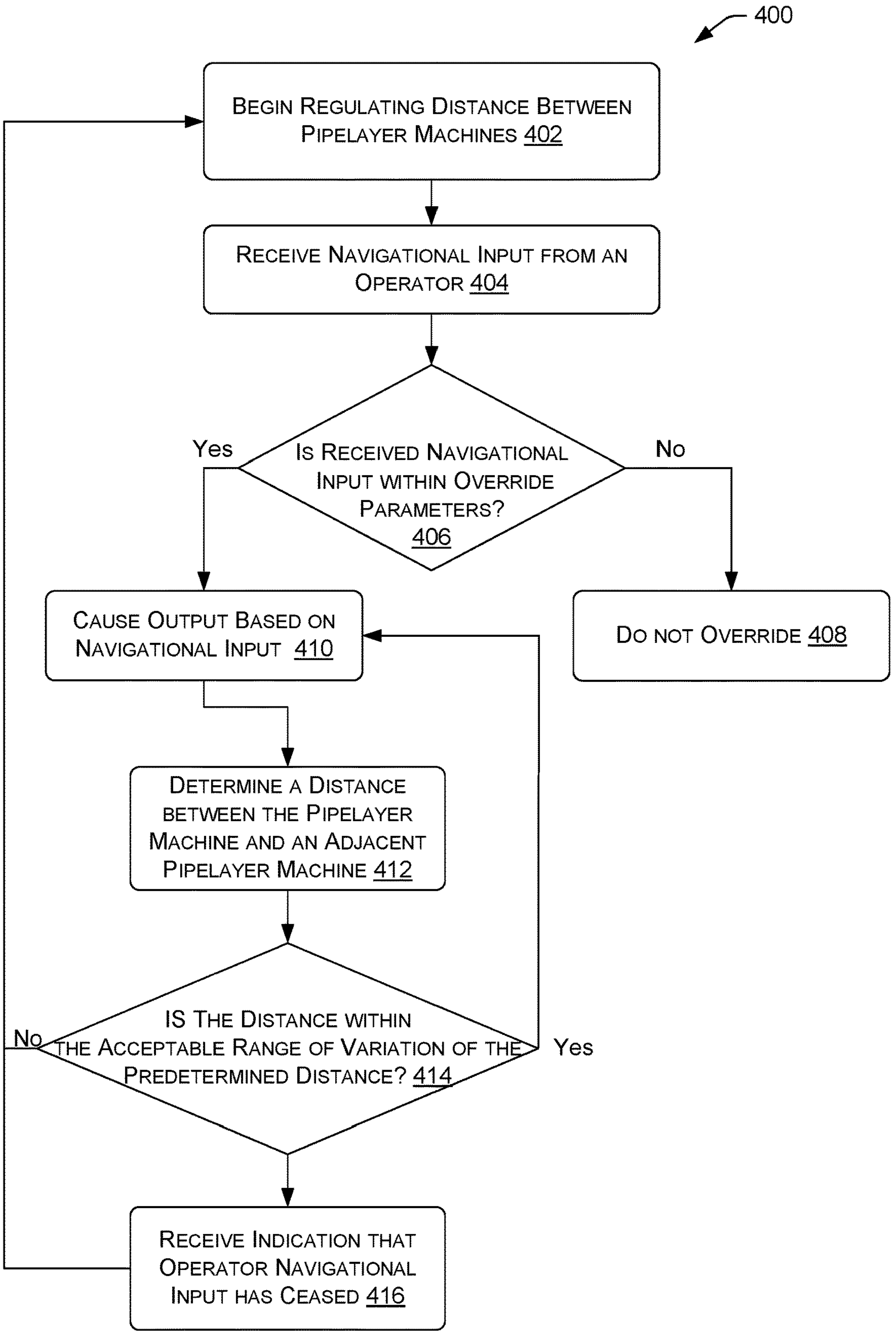
FIG. 4 is a flowchart illustrating an exemplary disclosed process for overriding automatic distance regulation in accordance with an example of the present disclosure.

FIG. 4 shows an exemplary method 400 for overriding automatic distance regulation, consistent with examples of the disclosure. The example method 400 is illustrated as a collection of steps in a logical flow diagram, which represents operations that may be implemented in hardware, software, or a combination thereof. In the context of software, the steps represent computer-executable instructions stored in memory. Such computer-executable instructions may include routines, programs, objects, components, data structures, and the like that perform particular functions or implement particular abstract data types. The order in which the operations are described is not intended to be construed as a limitation, and any number of the described steps may be combined in any order and/or in parallel to implement the process. For discussion purposes, and unless otherwise specified, the method 400 is described with reference to the pipelayer machines 102, the controller 130, and/or other components shown in FIGS. 1, 2 and 3. In particular, and unless otherwise specified, the method 400 will be described with respect to the controller 130 for ease of description.

At 402, the controller 130 may begin to monitor a distance between a pipelayer machine 102(1) and at least one adjacent pipelayer machine 102(2) to maintain the distance within a predetermined tolerance of a predetermined distance. Such a process, as shown and described in FIG. 3, may be referred to herein as "automatic distance regulation". In some examples, an operator may toggle a selectable input to initiate the automatic distance regulation. Thus, an operator may be provided with an input switch (either physical or provided electronically via the user interface 138) to turn the automatic distance regulation on and off. As described above, the controller 130 may cause the pipelayer machine 102(1) to adjust position in order to maintain such a distance. In some examples, the controller 130 may autonomously control navigation of a pipelayer machine 102(1) while a pipe 110 is laid in a trench 116.

At 404, the controller 130 may receive navigational input from an operator via the one or more operator controls 214 that control operation of the pipelayer machine 102(1). In some examples, the controller 130 may receive such input while the automatic distance regulation is still turned on. Furthermore, the controller 130 may receive such input from a remote-control station having a remote operator.

At 406, the controller 130 may determine whether the received navigational input is within override parameters. For example, the controller 130 may store override parameters that specify acceptable navigational inputs and thresholds thereof that an operator may make in order to override the automatic distance regulation of the controller 130. Such override parameters may include acceleration rates, deceleration rates, ranges of variation from the predetermined distance, velocities, etc. In some examples, the controller 130 may determine, from the navigational input, whether the resultant movement of the pipelayer machine 102(1) would be within the acceptable range of variation of the predetermined distance. Furthermore, a job foreman or other jobsite supervisor may specify override parameters and provide such data to the controller 130. Thus, a foreman or other jobsite supervisor may be able to specify different override parameters for different pipelayer machine operators.

If, at 406, the controller 130 determines that the navigational input is outside of the override parameters, the controller 130 may not grant the operator override of the automatic distance regulation and will not override the automatic distance regulation of the controller 130, at 408. Thus, the controller 130 may prevent inadvertent or erroneous navigation of the pipelayer machine 102(1).

If, however, at 406, the controller 130 determines that the navigational input is within the override parameters, the controller 130 may cause commensurate output in one or more components of the pipelayer machine 102(1) that corresponds with the navigational input received form the operator. For example, the controller 130 may cause an increase or decrease output of the propulsion system 104, cause one or more traction devices 106 to rotate, etc. Thus, the controller 130 may provide the operator a seamless method to interrupt the automatic distance regulation to control navigation or other movement of the pipelayer machine 102.

At 412, the controller 130 may determine and/or monitor the distance between the pipelayer machine 102(1) and at least one adjacent pipelayer machine 102(2). As described above with respect to FIG. 3, the controller 130 may determine such a distance via distance data received from the ranging system 114 of the pipelayer machine 102(1).

At 414, the controller 130 may determine whether the distance between the pipelayer machine 102(1) and the at least one adjacent pipelayer machine 102(2) is within an acceptable range of variation (or predetermined tolerance described above) of the predetermined distance that the controller 130 is to maintain between pipelayer machines 102. As mentioned previously, the acceptable range of variation may be specified by an operator, jobsite supervisor, or other user. Furthermore, the acceptable range of variation may include an override range of variation specified in the override parameters. The override range of variation may include a distance greater than or less than the predetermined distance that an operator is allowed to navigate the pipelayer machine 102(1) within while overriding the automatic distance control of the controller 130.

If, at 414, the controller 130 determines that the distance between the pipelayer machine 102(1) and the at least one adjacent pipelayer machine 102(2) is within the acceptable range of variation, the controller 130 may follow the "Yes" path from 414 and continue to grant operator control of the pipelayer machine 102(1) and may continue to cause output commensurate with the navigational input received from the operator at 410. However, if, at 414, the controller determines that the distance between the pipelayer machine 102(1) and the at least one adjacent pipelayer machine 102(2) is outside the acceptable range of variation, the controller 130 may follow the "No" path and may resume regulating the distance between the pipelayer machines 102 at 402. Thus, once an operator navigates the pipelayer machine 102(1) outside of the acceptable range of variation, the controller 130 may in turn override the operator's control of the pipelayer machine 102(1) and regulate the distance between the pipelayer machines 102(1) making position adjustments when needed as described in FIG. 3.

At 416, the controller 130 may receive an indication that the operator navigational input has ceased. If the controller 130 receives such an indication, the controller 130 may automatically resume regulating the distance between pipelayer machines 102.

Figure 5:
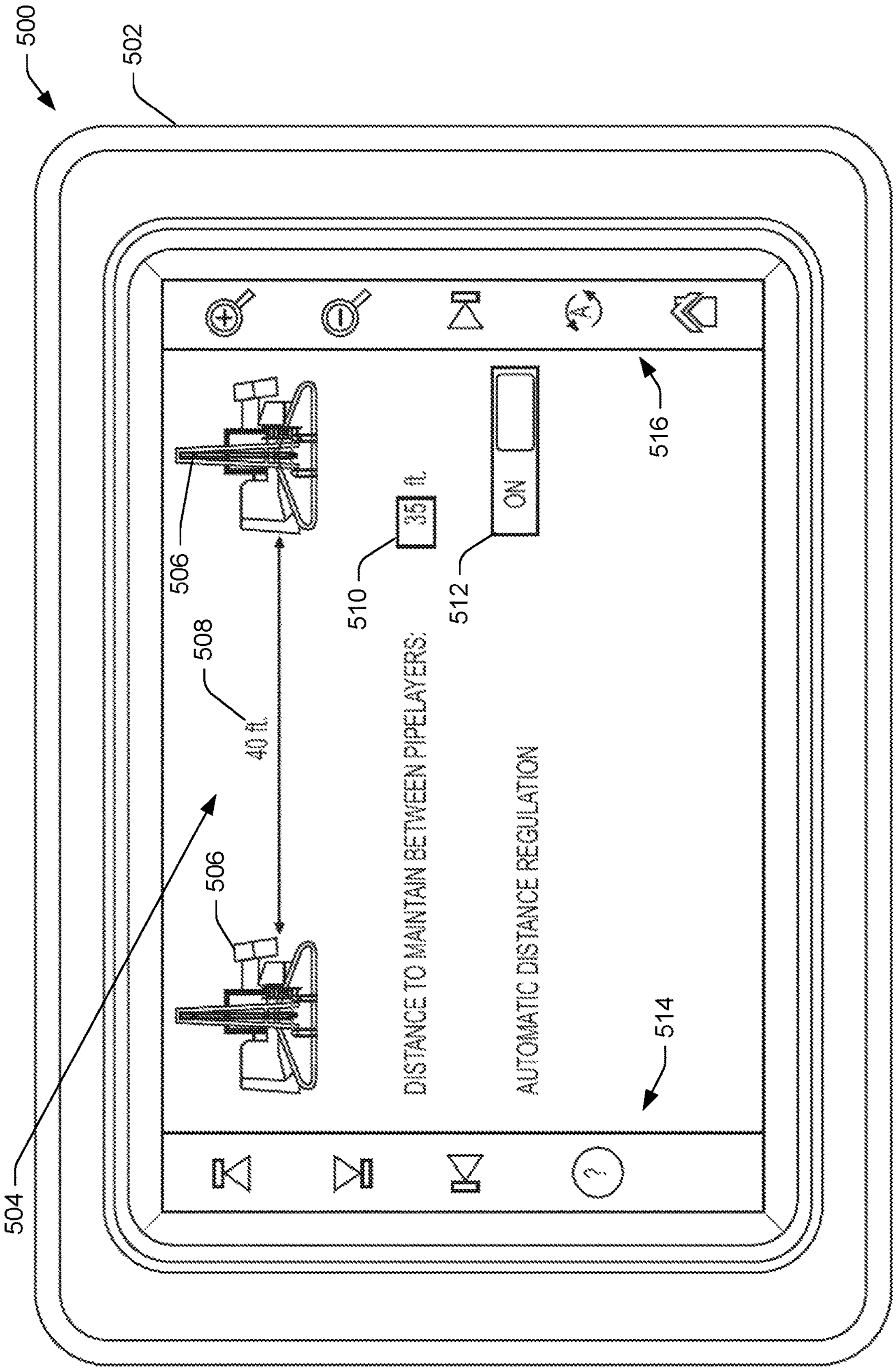
FIG. 5 is an illustration of an example user interface generated by the controller shown in FIG. 2.

FIG. 5 illustrates an example user interface 500 of the present disclosure. The example user interface 500 may comprise the user interface 138 described above with respect to FIG. 1, and the user interface 500 of FIG. 5 is shown as being displayed on an LCD display, a CRT display, a touch-screen (e.g., a capacitive/touch-sensitive) display device, and/or other display 502. In some examples, the display 502 may comprise a display of the electronic device 136, a display associated with the system controller 134, and/or a display associated with a pipelayer machine 102. As mentioned previously, the display 502 may be included on the electronic device 136 disposed within the cab 112 of the pipelayer machines 102.

As shown in FIG. 5, the user interface 500 may include information 504 indicative of a distance between pipelayer machines. Such a distance may be visually represented by a graphical distance displayed between two pipelayer machine indicia 506. The information 504 may represent distance data received from the ranging system 114. The information 504 may include a numerical value 508 representing a real time distance between a pipelayer machine 102 and at least one adjacent pipelayer machine. In an example where the controller 130 monitors a distance between the pipelayer machine 102 and multiple other pipelayer machines, the information 504 may include two or more pipelayer machine indicia 506.

The user interface 500 may further include an input location 510 where a user is able to specify a predetermined distance for the pipelayer machine 102 to maintain with at least one adjacent pipelayer machine. In some examples, the user interface 500 may also include input locations for a user to specify a predetermined tolerance, override tolerance, and/or other inputs. The user interface 500 may also include a selectable icon 512 that a user may select to toggle the automatic distance regulation described above. The user interface may also include various other controls 514, 516 configured to operate, access, and/or control various other features of the user interface 500 and/or various other operations of the pipelaying system component with which the display 502 is associated.

INDUSTRIAL APPLICABILITY

The present disclosure describes systems and methods for monitoring and adjusting distance between pipelayer machines 102. Such systems and methods may be used to assist an operator in the operation of a pipelayer machine 102 in order to maintain a specified distance between a pipelayer machine 102 and at least one adjacent pipelayer machine. Furthermore, the systems and method described herein may be used to provide autonomous and/or semi-autonomous operation of pipelayer machines 102. The systems and methods described herein may receive a predetermined distance and may determine an actual distance between pipelayer machines. The systems and methods described herein may determine whether the actual distance is within a predetermined tolerance of the predetermined distance. If the actual distance is outside of the predetermined tolerance, the systems and methods described herein may cause one or more pipelayer machines to adjust position (or position relative to another pipelayer machine) in order to bring the actual distance within the predetermined tolerance.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A pipelayer machine comprising:
a propulsion system;
a load sensing system;
a ranging system; and
a controller in communication with the propulsion system and the ranging system, the controller being configured to:
determine, based on the load sensing system, a load distribution between the pipelayer machine and an adjacent pipelayer machine;
determine a first distance that the pipelayer machine is to maintain between the pipelayer machine and the adjacent pipelayer machine based at least in part on the load distribution;
receive a predetermined tolerance range defining an acceptable range of variation around the first distance, wherein the acceptable range of variation has a value greater than zero;
determine, via the ranging system, a second distance between the pipelayer machine and the adjacent pipelayer machine;
determine that a difference between the first distance and the second distance is outside of the predetermined tolerance range; and
modify output of the propulsion system based at least in part on determining that the difference is outside of the predetermined tolerance range, wherein modifying the output of the propulsion system causes acceleration or deceleration of the pipelayer machine.

2. The pipelayer machine according to claim 1, wherein the ranging system includes one or more non-contact sensors.

3. The pipelayer machine according to claim 2, wherein the one or more non-contact sensors include at least one of a RADAR sensor, a LIDAR sensor, a SONAR sensor, a camera, a GPS, a machine-to-machine communication device, or a UTS device.

4. The pipelayer machine according to claim 1, further comprising an electronic device located remotely from the pipelayer machine and in communication with the controller, the electronic device having a display that provides a user interface, wherein determining the first distance is based at least in part on an input from a user via the user interface.

5. The pipelayer machine according to claim 1, wherein the second distance is greater than the predetermined tolerance range and the controller is further configured to:
modify the output of the propulsion system to reduce the second distance between the pipelayer machine and the adjacent pipelayer machine;
determine a third distance between the pipelayer machine and the adjacent pipelayer machine;
determine whether the third distance is within the predetermined tolerance range; and
modify the output of the propulsion system to maintain the third distance between the pipelayer machine and the adjacent pipelayer machine based at least in part on determining that the third distance is within the predetermined tolerance range.

6. The pipelayer machine according to claim 1, wherein the second distance is less than the first distance and the controller is further configured to:
modify the output of the propulsion system to increase the second distance between the pipelayer machine and the adjacent pipelayer machine;
determine a third distance between the pipelayer machine and the adjacent pipelayer machine;
determine whether the third distance is within the predetermined tolerance range; and
modify the output of the propulsion system to maintain the third distance between the pipelayer machine and the adjacent pipelayer machine based at least in part on determining that the third distance is within the predetermined tolerance range.

7. The pipelayer machine according to claim 1, further comprising one or more operator controls in communication with the controller, the one or more operator controls configured to control navigation of the pipelayer machine, wherein the controller is further configured to:
receive, via the one or more operator controls, navigational input from an operator to control movement of the pipelayer machine;
determine whether the navigational input is within override parameters; and
cause output that is commensurate with the navigational input based on determining that the navigational input is within override parameters, wherein the output modifies the output of the propulsion system.

8. The pipelayer machine according to claim 7, wherein the controller is further configured to:
determine, via the ranging system, whether the second distance between the pipelayer machine and the adjacent pipelayer machine is within an override tolerance range of the first distance;
cease output of the navigational input based on determining that the second distance is outside of the override tolerance range of the first distance; and
modify the output of the propulsion system based on determining that the second distance is outside the override tolerance range of the first distance.

9. A method of automatically regulating distance between a pipelayer machine and at least one adjacent pipelayer machine, the method comprising:
determining, based on a load sensing system, a load distribution between the pipelayer machine and the at least one adjacent pipelayer machine;
determining a first distance that the pipelayer machine is to maintain between the pipelayer machine and the at least one adjacent pipelayer machine based at least in part on the load distribution;
determining, via one or more sensors of the pipelayer machine, a second distance between the pipelayer machine and the at least one adjacent pipelayer machine;
determining whether the second distance is within an acceptable range of the first distance;
monitoring, via communication between a first controller of the pipelayer machine and a second controller of the at least one adjacent pipelayer machine, operation of the at least one adjacent pipelayer machine; and
modifying, via the first controller of the pipelayer machine and based at least in part on monitoring the operation of the at least one adjacent pipelayer machine, output of a propulsion system of the pipelayer machine to adjust a position of the pipelayer machine relative to the at least one adjacent pipelayer machine.

10. The method according to claim 9, wherein the first controller and the second controller are communicatively coupled to one another.

11. The method according to claim 9, wherein the one or more sensors of the pipelayer machine include one or more non-contact sensors.

12. The method according to claim 9, wherein the pipelayer machine and the at least one adjacent pipelayer machine are traveling in a first direction and modifying the output of the propulsion system accelerates or decelerates the pipelayer machine relative to the first direction.

13. The method according to claim 9, further comprising:

determining that modifying the output of the propulsion system of the pipelayer machine does not adjust the position of the pipelayer machine relative to the at least one adjacent pipelayer machine; and sending a notification to an electronic device associated with an operator of the pipelayer machine, the notification including a warning indicating that the pipelayer machine is unable to maintain the first distance with the at least one adjacent pipelayer machine, wherein the notification includes at least one of an audio notification or a visual notification.

14. The method according to claim 13, wherein the first controller sends the notification to the at least one adjacent pipelayer machine.

15. A pipelayer machine comprising:

a propulsion system;

an electronic device having a user interface;

one or more sensors; and a controller in communication with the propulsion system, the user interface, and the one or more sensors, the controller being configured to:

determine, based on the one or more sensors, a load distribution between the pipelayer machine and a plurality of adjacent pipelayer machines;

determine a first distance that the pipelayer machine is to maintain between the pipelayer machine and each of the plurality of adjacent pipelayer machines based at least in part on the load distribution, wherein the plurality of adjacent pipelayer machines includes a first pipelayer machine positioned in front of the pipelayer machine and a second pipelayer machine positioned behind the pipelayer machine;

determine, via the one or more sensors, a second distance between the pipelayer machine and the first pipelayer machine;

determine whether the second distance is within an acceptable range of the first distance;

determine, via the one or more sensors, a third distance between the pipelayer machine and the second pipelayer machine;

determine whether the third distance is within the acceptable range of the first distance; and cause, via the controller, the pipelayer machine to navigate in order to adjust a position of the pipelayer machine relative to each of the first pipelayer machine and the second pipelayer machine based at least in part on determining that the second distance or the third distance is outside of the acceptable range of the first distance.

16. The pipelayer machine according to claim 15, wherein causing the pipelayer machine to navigate includes modifying a speed of an engine of the propulsion system, modifying a speed of a transmission of the propulsion system, or changing a gear of the transmission in order to accelerate or decelerate the pipelayer machine.

17. The pipelayer machine according to claim 15, wherein the one or more sensors include one or more non-contact sensors and the second distance is determined via the one or more non-contact sensors.

18. The pipelayer machine according to claim 15, wherein the controller is further configured to:

send a notification to the user interface indicating that the second distance is outside of the acceptable range of the first distance, the notification including at least one of audio data or image data.

19. The pipelayer machine according to claim 15, wherein the user interface includes a visual representation of the first distance and the second distance.

20. The pipelayer machine according to claim 15, further comprising one or more operator controls to control operation of the pipelayer machine, wherein the controller is further configured to:

receive, via the one or more operator controls, input data from an operator to control operation of the pipelayer machine;

determine whether the input data is within override parameters;

modify output of the propulsion system commensurate with the input data received from the one or more operator controls;

determine, via the one or more sensors, a fourth distance between the pipelayer machine and the first pipelayer machine or the second pipelayer machine;

determine that the fourth distance is outside of the acceptable range of the first distance; and resume regulating distance between the pipelayer machine and the first pipelayer machine or the second pipelayer machine based on determining that the fourth distance is outside of the acceptable range.

* * * * *